3,463,553
PNEUMATIC CONVEYOR
Michel Boucraut, Metz, Imré Toth, Longevilla-les-Metz, and Jacques Blum, Metz, France, assignors to Institut de Recherches de la Siderurgie Francaise, Saint-Germain-en-Laye, Yvelines, France
Filed Nov. 14, 1967, Ser. No. 682,855
Claims priority, application France, Nov. 18, 1966, 84,141
Int. Cl. B65g 53/16, 53/42
U.S. Cl. 302—17     5 Claims

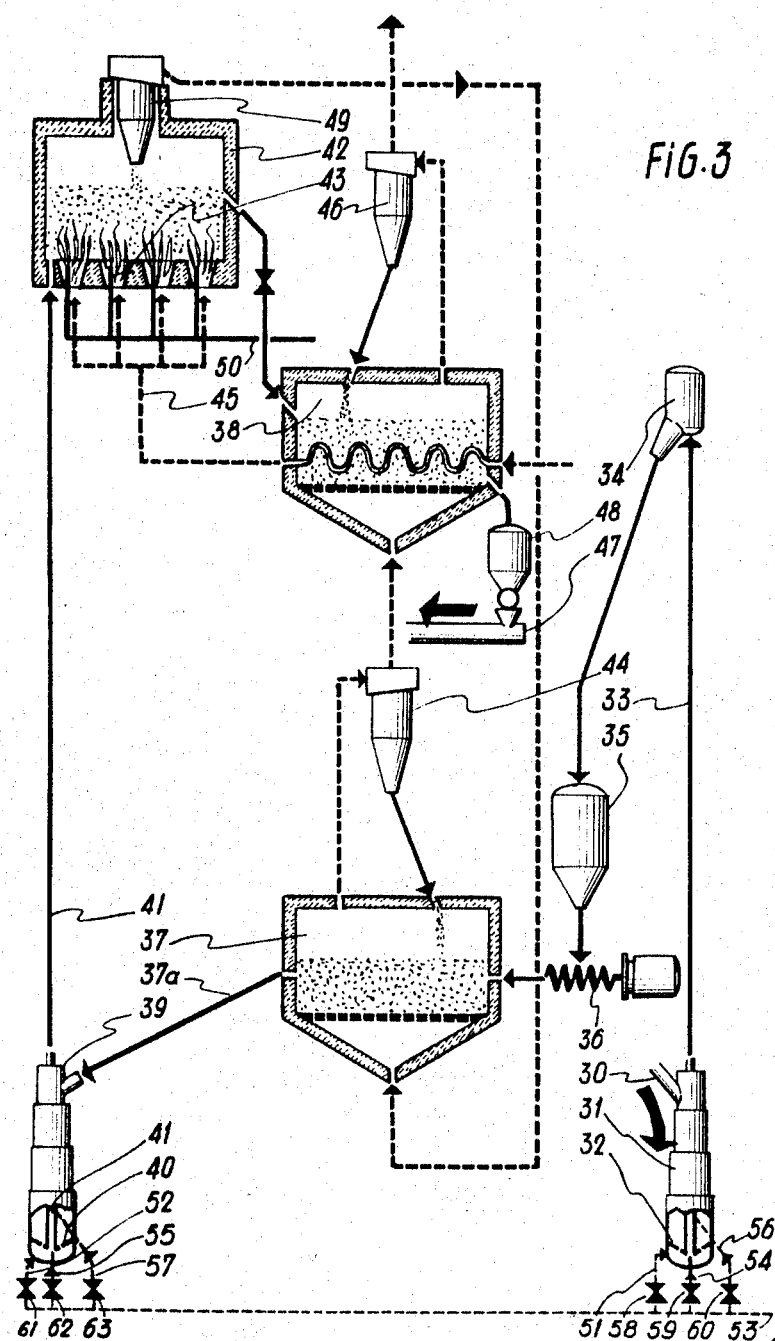

ABSTRACT OF THE DISCLOSURE

A pneumatic conveyor for transfer of pulverulent material from a lower level to a higher level comprises an upright receptacle whose internal diameter diminishes, gradually and/or stepwise, from the lower end toward the upper end and which receives pulverulent material through feed pipes connected with its upper end. A hollow bottom has an apertured top wall affixed to the lower end of the receptacle and is connected with a source of compressed air to discharge currents of air which pass through the top wall and fluidize the material in the lower zone of the receptacle. An evacuating pipe extends centrally through and upwardly beyond the receptacle and its intake end is located directly above an ejector nozzle which discharges compressed air and extends into the lowermost zone of the receptacle. The stream of ascending material is accelerated by compressed air which is admitted into the evacuating pipe above the intake end.

Background of the invention

The present invention relates to pneumatic conveyors in general, and more particularly to improvements in pneumatic conveyors for transfer of granular, pulverulent and otherwise comminuted materials from a lower level to a higher level.

Summary of the invention

It is an object of our invention to provide a pneumatic conveyor with automatic regulation of flow of pulverulent material from a lower level to a higher level.

Another object of the invention is to provite a pneumatic conveyor which prevents bridging of pulverulent pulverulent material and wherein such material need not come in contact with any moving parts.

A further object of the invention is to provide a pneumatic conveyor which prevents bridging of pulverulent material.

An addition object of the invention is to provide a pneumatic conveyor which can be used for continuous transfer of pulverulent material from a lower level to a higher level irrespective of fluctuations in the rate at which the material is being supplied thereto.

Still another object of the invention is to provide a pneumatic conveyor which can be used for transfer of pulverulent material from a low-pressure area to a high-pressure area.

Another object of the invention is to provide a conveyor which can transfer material at a rate corresponding to that at which the material is being supplied thereto.

The improved conveyor comprises an elongated preferably upright receptacle defining an internal space whose cross-sectional area is smaller at its upper end than at its lower end, a feed including one or more pipes for supplying material into the receptacle at a point remote from the lower end, preferably into the upper end of the internal space, fluidizing means provided at the lower end of the receptacle to fluidize the material in the lower end and preferably comprising an apertured top wall which permits passage of currents of compressed air into the lowermost zone of the internal space, tubular evacuating means having an intake end located in the receptacle above the fluidizing means and an elongated pipe preferably extending centrally of the receptacle through and beyond the upper end of the internal space, and ejector means for inducing the flow of fluidized material into the intake end and upwardly through the evacuating means. Such ejector means preferably includes a nozzle connected with a source of compressed gas and installed in the top wall of the fluidizing means to direct a jet of compressed gas into the intake end of the evacuating means.

The novel features which are considered as characteristic of the invention are set forth in particular in the appended claims. The improved conveyor itself, however, both as to its construction and its mode of operation, together with additionally features and advantages thereof, will be best understood upon perusal of the following detailed description of certain specific embodiments with reference to the accompanying drawing.

Brief description of the drawing

FIG. 3 is a diagrammatic partly elevational and partly sectional view of a metallurgical apparatus embodying two improved pneumatic conveyors.

Description of the preferred embodiments

Figure 1:
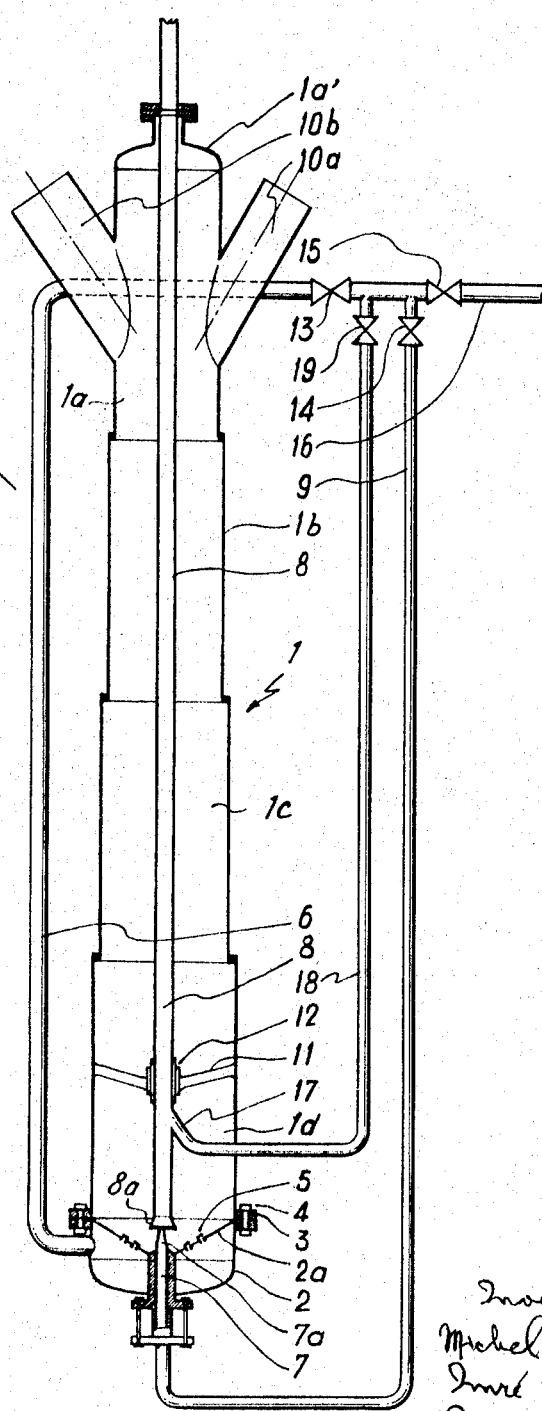
FIG. 1 is a partly elevational and partly sectional view of a pneumatic conveyor for pulverulent materials which embodies one form of our invention.

Referring first to FIG. 1, there is shown a penumatic conveyor which comprises an elongated upright receptacle 1 assembled of several coaxial cylindrical sections 1a, 1b, 1c, 1d which may but need not taper in upward direction. The diameter of the lower end of each of the sections 1a–1c is less than the diameter at the upper end of the section (1b–1d) located therebelow so that the cross-sectional area of the interior of the receptacle 1 diminishes gradually and/or stepwise from top to bottom. A fluidizing bottom 2 is sealingly coupled to the lower end of the lowermost section 1d by means of flanges 3 and bolts or screws 4. The bottom 2 is hollow and its top wall 2a resembles a cone which tapers downwardly and inwardly toward the axis of the receptacle 1. This top wall 2a is provided with several nozzles or orifices 5 which admit air or another gas into the lowermost region of the internal space of the receptacle 1 to fluidize a pulverulent material which is supplied to the top section 1a by means of one or more feed pipes, two such feed pipes being shown at 10a and 10b. In the illustrated embodiment, the interior of the hollow bottom 2 receives compressed air through a supply conduit 6 which is connected to a suitable source of compressed gas (e.g., an air compressor or a pressure tank) through the intermediary of a main supply conduit 16.

An ejector nozzle 7 is installed in the lower end wall of the bottom 2 and extends upwardly through the central portion of the top wall 2a so that the orifice in its upwardly tapering tip 7a discharges a jet of compressed air or another suitable gas into the interior of the lowermost section 1d and into the outwardly and downwardly flaring intake end 8a of an evacuating pipe 8 which extends centrally and upwardly through the receptacle 1 and through a top wall 1a' at the upper end of the topmost section 1a. The nozzle 7 receives compressed air from a supply conduit 9 which branches from the main supply conduit 16. The upper or discharge end (not shown) of the evacuating pipe 8 extends to a desired level above the receptacle 1 and discharges a continuous stream of pulverulent material into a suitable receiver, not shown in FIG. 1. The means for centering the evacuating pipe 8 in the receptacle 1 comprises a sleeve 12 which is carried by substantially radially extending arms 11 affixed to the lower most section 1d. One or more additional centering means may be provided in the section 1d and/or in the sections 1a–1c. The pipe 8 is preferably movable axially of the sleeve 12.

Two manually or automatically operated regulating valves 13, 14 control the admission of compressed air from the main supply conduit 16 to the supply conduits 6 and 9. The numeral 15 is a shutoff valve in the main supply conduit 16 which is operated to prevent admission of compressed air when the conveyor is not in use.

The conveyor further comprises means for accelerating the stream of pulverulent material which travels upwardly through the evacuating pipe 8. Such accelerating means comprises one or more auxiliary air admitting conduits 18 connected to the main supply conduit 16 and having discharge ends 17 connected to the evacuating pipe 8 in the interior of the receptacle 1. Air admitted by the discharge end or discharge ends 17 reduces the concentration of pulverulent material in the pipe 8 and thus enhances the acceleration of particles. Moreover, such auxiliary conduit or conduits 18 prevent agglomeration of pulverulent material in the pipe 8 and facilitate complete evacuation of pulverulent material from the pipe 8 when the conveyor is brought to a halt. Still further, the conduit or conduits 18 facilitate restarting of the conveyor. The admission of air into the conduit 18 can be regulated by a valve 19.

Figure 2:
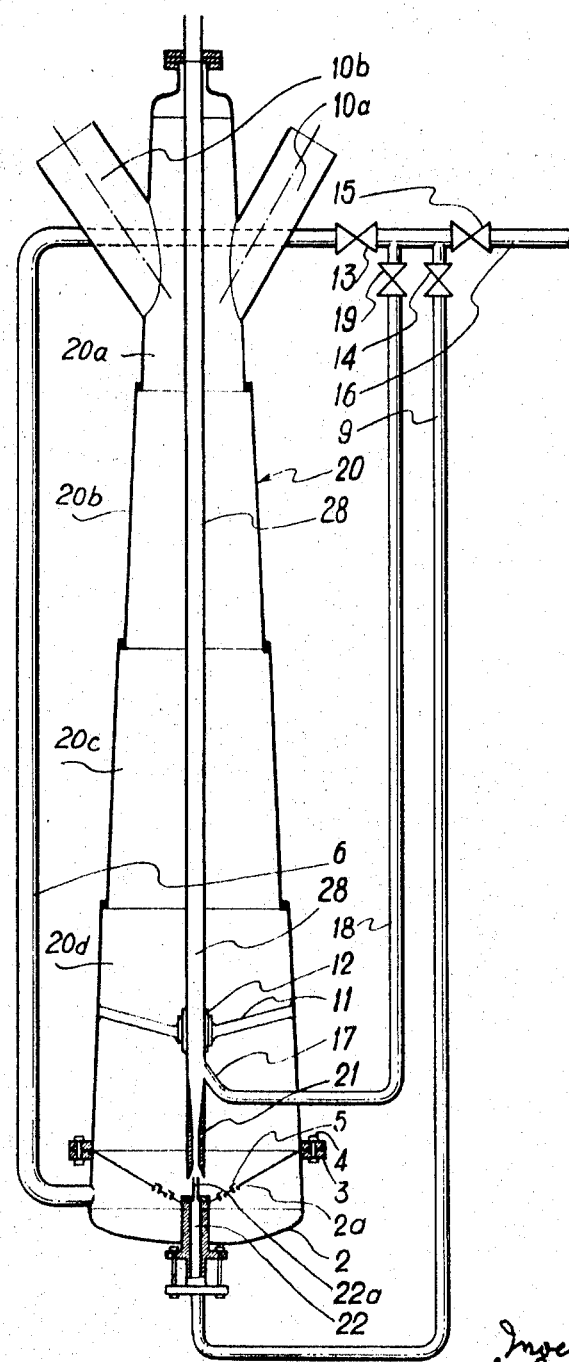
FIG. 2 is a similar partly elevational and partly sectional view of a second penumatic conveyor.

FIG. 2 illustrates a modified pneumatic conveyor. The receptacle 20 of this conveyor comprises four hollow frustoconical sections 20a–20d which are welded or otherwise bonded to each other. The base of each sperimposed conical section has a diameter which is at least slightly less than the diameter of the top part of the section therebelow. The lower or intake end of the evacuating pipe 28 is provided with a venturi 21. The ejector nozzle 22 extends through the top wall 2a of the fluidizing bottom 2 and has a smaller-diameter cylindrical tip 22a which is coaxial with and is located directly below the material admitting end of the venturi 21. The remaining parts of this conveyor are identical with those described in connection with FIG. 1 and are denoted by similar reference numerals.

The improved conveyor can be modified in a number of ways without departing from the spirit of our invention. For example, the deceptacle 1 or 20 can be replaced by a one-piece receptacle whose diameter decreases gradually or step wise in a direction from the fluidizing means toward its top end. Thus, the receptacle 1 or 20 can be replaced by a one-piece frustum of a hollow cone whose base is affixed to the bottom 2. Moreover, the top wall 2a of the bottom 2 can be replaced by a foraminous panel or plate or by a grate which can admit currents of compressed gas into the lowermost part of the receptacle to fluidize the material therein.

FIG. 3 illustrates a metallurgical apparatus which employs two pneumatic conveyors of the type shown in FIG. 1 or 2. This apparatus is used for magnetizing roasting of iron ore.

Crude ore which has been classified in a conventional classifying apparatus (not shown) descends by gravity in a feed pipe 30 and enters an upright receptacle 31 which forms part of a first pneumatic conveyor having an upwardly extending evacuating pipe 33 and a fluidizing bottom 32 as shown in the lower right-hand portion of FIG. 3. The receptacle 31 is assembled of several superimposed frustoconical sections which are welded to each other and whose internal diameters diminish in a direction upwardly and away from the bottom 32. The evacuating pipe 33 delivers a continuous stream of pulverulent material into a vessel 34 whose outlet discharges such material by gravity into a hopper 35. The outlet of the hopper 35 discharges pulverulent material into a schematically indicated screw conveyor 36 which feeds the material into a container 37 forming part of a heat exchanger. The latter further comprises two additional containers 38 of which only one is shown in FIG. 3. The containers 38 are of identical size and are located at the opposite sides of the container 37, not above the container 37 as shown in FIG. 3 for the sake of clarity. The container 37 is provided with means for fluidizing the pulverulent material by means of a gas which is admitted from below as indicated by a broken line. The fluidized material is discharged by gravity through a conduit 37a which constitutes a feed pipe for a second pneumatic conveyor shown in the lower left-hand portion of FIG. 3. The second conveyor comprises an upright tubular receptacle 39 which is similar to or identical with the receptacles 31, a fluidizing bottom 40 and an upwardly extending evacuating pipe 41. The latter discharges a continuous stream of pulverulent material into a reactor 42 which is provided with burners 43 for direct combustion. The pressure in the reactor 42 exceeds the pressure in the container 37 by about one-half of an atmosphere, but this does not affect the operation of the second pneumatic conveyor. The material in the reactor 42 is fluidized by combustion products and is converted into magnetite. The magnetite is evacuated into the containers 38 and is fluidized by gases issuing from the container 37. Such gases are segregated from solid matter in a cyclone 44 which returns the solids into the container 37 and admits purified gases into the containers 38. The beds of hot fluidized material in the containers 38 are traversed by pipes 45 which supply air to the burners 43, i.e., such air is preheated by exchange of heat with magnetite in the containers 38. At the same time, the air cools the magnetite and such cooling action is assisted by transfer of heat to the walls of the containers 38. Gases issuing from the containers 38 are segregated from solids in a cyclone 46 which returns the solids into the containers 38 and discharges purified gases into the atmosphere as shown by a broken line. Fumes issuing from the reactor 42 are segregated from dust in a cyclone 49 which discharges clean gases into the lower part of the container 37 as indicated by a broken line. Thus, such gases heat the ore in the container 37 before the ore enters the second pneumatic conveyor. The cyclone 49 is installed directly in the reactor 42. Conduits 50 supply liquid fuel to the burners 43. In FIG. 3, the path of pulverulent material is indicated by heavy solid lines and the path of gases is indicated by broken lines. A hopper 48 receives magnetite from the containers 38 and supplies such material to an endless takeoff belt 47.

Supply conduits 51, 52 respectively supply compressed air to the bottoms 32, 40, and conduits 54, 55 supply compressed air to ejector nozzles in the receptacles 31, 39. The conduits 51, 52, 54, 55 receive compressed air from a main supply conduit 53. The numerals 56, 57 indicate auxiliary conduits which supply compressed air into the evacuating pipes 33, 41. Valves 58, 59, 60 and 61, 62, 63 are respectively provided in the conduits 51, 54, 56 and 52, 55, 57 to regulate the admission of compressed air.

Example

Iron ore with a mesh of 0–3 millimeters is introduced into the apparatus of FIG. 3 at a rate of 15 tons per hour. The height of the receptacles 31, 39 is 4½ meters and the internal diameters of these receptacles decrease from a maximum diameter of 590 millimeters at the lower ends to a minimum diameter of 390 millimeters at the upper ends. The internal diameter of the evacuating pipes 33, 41 is 66 millimeters and these pipes convey air at the rate of 20 cubic meters per hour. The absolute pressure of air which is used for fluidization of ore in the receptacles 31, 39 is 1.8 atmospheres. The length of the evacuating pipe 33 is 13 meters and the length of the pipe 41 is 15 meters. Relative pressure in the container 37 is 0.3 atmosphere and relative pressure in the reactor 42 is 0.8 atmosphere. Thus, pressure in the vessel 42 which is located downstream of the container 37 exceeds the pressure in this container by 0.5 atmosphere. It will be seen that the improved pneumatic conveyors can supply pulverulent material from a first vessel to a second vessel wherein the pressure exceeds the pressure in the first vessel. The pressure in the container 37 is the same as that at the material inlet of the receptacle 39.

An important advantage of a receptacle wherein the cross-sectional area of the internal space diminishes from the lower end toward the upper end is that fluidized material cannot rise in the receptacle irrespective of conditions prevailing in the internal space. On the other hand, the pressure in the lower region of the receptacle is a function of the height of the fluidized column or layer above the top wall 2a; therefore, the receptacle is preferably installed in vertical position. The column or layer of fluidized pulverulent material in the lower part of the receptacle behaves not unlike a body of liquid. The pressure of fluidized material is added to the pressure at the discharge ends of the feed pipes, i.e., the pressure at the discharge end of the evacuating pipe can be much higher than the pressure at the discharge ends of the feed pipes so that, and as explained connection with FIG. 3, the conveyor can deliver pulverulent material from a low-pressure area at a lower level to a high-pressure area at a higher level. The pressure at the lower level where the conveyor receives material can equal atmospheric pressure.

Another important advantage of our conveyor is that it brings about automatic regulation of the rate of material outflow in response to fluctuations in the rate at which the pipe 10a and/or 10b feeds material into the receptacle. If the rate of feed increases, the height of the column or layer of fluidized material above the top wall 2a increases but such fluidized material cannot leave the receptacle because of the diminishing cross-sectional area of the internal space in the receptacle. Thus, the pressure in the lower zone of the receptacle increases and causes the evacuating pipe to convey the material at a higher rate. In other words, the rate at which the evacuating pipe evacuates material is a function of the height of the supply of material in the receptacle. Additional adjustments can be achieved by regulating, within limits, the rate of admission of compressed air through the conduits 6, 9 and 18.

Still another advantage of our conveyor is that the material need not come in contact with moving parts. The conveyor can be used for transfer of hot pulverulent materials, for example, for transfer of ores at a temperature of up to and exceeding 800° C. At such elevated temperatures, the receptacle is preferably provided with an insulation of heat-resistant material.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A pneumatic conveyor, particularly for continuous transfer of pulverulent or like materials from a lower level to a higher level, comprising a substantially upright receptacle defining an internal space whose cross-sectional area diminishes stepwise from the lower toward the upper end thereof; a feed for supplying material into said receptacle at a point remote from said lower end thereof; fluidizing means provided at the lower end of said receptacle to fluidize the material at least in said lower end; tubular evacuating means having an intake end provided in said receptacle above said fluidizing means; and ejector means for inducing flow of fluidized material into said intake end.

2. A conveyor as defined in claim 1, wherein said receptacle comprises superimposed tubular sections which are bonded to each other.

3. A conveyor as defined in claim 2, wherein said sections are welded to each other and wherein said sections taper upwardly.

4. A conveyor as defined in claim 1, further comprising means for accelerating the material in said evacuating means comprising conduit means for admitting a compressed gas into said evacuating means in said receptacle at a level above said intake end.

5. A pneumatic conveyor, particularly for continuous transfer of pulverulent or like materials from a lower level to a higher level, comprising a substantially upright receptacle defining an internal space whose cross-sectional area is smaller at the upper than at the lower end thereof, said receptacle comprising superimposed tubular sections which are bonded to each other and constitute hollow conical frusta, said sections including at least one upper section and at least one lower section and said upper section having a lower end whose internal diameter is less than the internal diameter of the upper end of said lower section; a feed for supplying material into said receptacle at a point remote from said lower end thereof; fluidizing means provided at the lower end of said receptacle to fluidize the material in said lower end; tubular evacuating means having an intake end provided in said receptacle above said fluidizing means; and ejector means for inducing flow of fluidized material into said intake end.

References Cited

UNITED STATES PATENTS

| 1,616,547 | 2/1927 | Pontoppidan | 302—53 |
| 2,509,983 | 5/1950 | Morrow | 302—53 |
| 2,924,489 | 2/1960 | Beckmann | 302—53 |
| 3,007,744 | 11/1961 | Ward et al. | 302—53 |

FOREIGN PATENTS 260,677  1/1964  Australia.

ANDRES H. NIELSEN, Primary Examiner

U.S. Cl. X.R.

302—24, 52